US012747709B2

(12) United States Patent
Hattori et al.

(10) Patent No.: US 12,747,709 B2

(45) Date of Patent: Sep. 29, 2026

(54) CONTROLLER FOR A FUEL SUPPLY SYSTEM

(71) Applicant: TOYOTA JIDOSHA KABUSHIKI KAISHA, Toyota (JP)

(72) Inventors: Tatsunobu Hattori, Seto (JP); Ryota Iwasaki, Okazaki (JP); Yutaro Kitano, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/278,811

(22) Filed: Jul. 24, 2025

(65) Prior Publication Data

US 2026/0078706 A1 Mar. 19, 2026

(30) Foreign Application Priority Data

Sep. 17, 2024 (JP) ................................. 2024-159993

(51) Int. Cl.

| | |
|---|---|
| ***F02D 19/02*** | (2006.01) |
| ***F02D 19/06*** | (2006.01) |
| ***F02D 41/22*** | (2006.01) |
| ***F02M 21/02*** | (2006.01) |

(52) U.S. Cl.

CPC ......... *F02D 19/025* (2013.01); *F02D 19/027* (2013.01); *F02D 19/0644* (2013.01); *F02D 41/221* (2013.01); *F02M 21/0242* (2013.01); *F02D 2041/224* (2013.01)

(58) Field of Classification Search

CPC .... F02D 19/025; F02D 19/027; F02D 19/022; F02D 19/023; F02D 19/0644; F02D 19/0623; F02D 41/22; F02D 41/221; F02D 41/042; F02D 41/0027; F02D 2200/0602; F02D 2041/225; F02D 2041/224; F02M 21/0242

See application file for complete search history.

(56) References Cited

U.S. PATENT DOCUMENTS

| | | | | |
|---|---|---|---|---|
| 6,390,075 | B1 * | 5/2002 | Yamazaki .......... | F02M 21/0233 123/690 |
| 6,401,698 | B1 | 6/2002 | Yamazaki et al. | |
| 6,467,466 | B1 | 10/2002 | Maekawa et al. | |

(Continued)

FOREIGN PATENT DOCUMENTS

| | | | | |
|---|---|---|---|---|
| JP | 2000-274311 A | 10/2000 | | |
| JP | 2001-041106 A | 2/2001 | | |
| WO | WO-2011114757 A1 * | 9/2011 | ......... | F02D 19/0681 |

*Primary Examiner* — Grant Moubry

(57) ABSTRACT

A controller is applied to a fuel supply system. The controller is capable of controlling a hydrogen engine and a first shut-off valve and a second shut-off valve which are shut-off valves. The controller closes the shut-off valve when an operation for requesting stop of the hydrogen engine is performed by a user of a vehicle having the fuel supply system, and executes a failure determination routine for monitoring a drop speed of pressure of hydrogen gas on the downstream side of the shut-off valve while continuing operation of the hydrogen engine, and determining that the shut-off valve is not properly closed when the drop speed is slow. The controller stops the failure determination routine when the hydrogen engine is stopped due to an engine stall during execution of the failure determination routine.

5 Claims, 4 Drawing Sheets

(56) References Cited

U.S. PATENT DOCUMENTS

| | | | | |
|---|---|---|---|---|
| 7,442,452 | B2 * | 10/2008 | Miura | H01M 8/04388 429/424 |
| 2019/0242307 | A1 * | 8/2019 | Engfehr | F02D 19/0628 |
| 2022/0276113 | A1 * | 9/2022 | Yamagata | F01M 11/10 |

* cited by examiner

CONTROLLER FOR A FUEL SUPPLY SYSTEM

CROSS-REFERENCE TO RELATED APPLICATIONS

This application is based upon and claims the benefit of priority from Japanese Patent Application No. 2024-159993, filed on Sep. 17, 2024, the entire contents of which are incorporated herein by reference.

BACKGROUND

1. Field

The present disclosure relates to a controller.

2. Description of Related Art

Japanese Laid-Open Patent Publication No. 2000-274311 describes a controller in a fuel supply system. The fuel supply system includes a hydrogen engine that uses hydrogen gas as fuel, and a fuel tank that stores the hydrogen gas used by the hydrogen engine. The hydrogen gas stored in the fuel tank is sent to the hydrogen engine through a hydrogen pipe. The fuel supply system includes a shut-off valve arranged on the hydrogen pipe. The shut-off valve shuts off the hydrogen gas supplied from the fuel tank to the hydrogen engine in the hydrogen pipe.

The controller controls the hydrogen engine and the shut-off valve in the fuel supply system. The controller executes a failure determination routine. In the failure determination routine, the controller determines whether or not the shut-off valve has a failure based on a change in pressure of hydrogen gas at a location between the shut-off valve and the hydrogen engine in a state in which the shut-off valve is closed and the hydrogen engine is consuming hydrogen gas. In this description, a state in which the shut-off valve has a failure means a state in which the shut-off valve is not properly closed and does not shut off the hydrogen gas in the hydrogen pipe.

An engine stall may occur during execution of the failure determination routine. There is room for improvement in measures for an instance when an engine stall occurs during execution of the failure determination routine.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An aspect of the processing circuitry is a controller for a fuel supply system that includes a hydrogen engine configured to use hydrogen gas as fuel, a fuel tank configured to store the hydrogen gas, a hydrogen pipe used to guide the hydrogen gas from the fuel tank to the hydrogen engine, a shut-off valve arranged on the hydrogen pipe and configured to shut off supply of the hydrogen gas from the fuel tank to the hydrogen engine, and an injector configured to inject the hydrogen gas into the hydrogen engine. The controller includes processing circuitry configured to control the shut-off valve and the hydrogen engine. In response to an operation that requests to stop the hydrogen engine performed by a user of a vehicle including the fuel supply system, the processing circuitry is configured to execute a failure determination routine. The failure determination routine includes executing a control that closes the shut-off valve and then monitoring a decrease rate of pressure of the hydrogen gas at a downstream side of the shut-off valve while keeping the hydrogen engine running, and determining that the shut-off valve is not properly closed based on the decrease rate being less than that when the shut-off valve is properly closed. The processing circuitry is configured to stop the failure determination routine in response to a stop of the hydrogen engine caused by an engine stall during execution of the failure determination routine.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, “at least one of A and B” should be understood to mean “only A, only B, or both A and B.”

Hereinafter, an embodiment of a controller will be described with reference to FIGS. 1 to 4.

Configuration of Fuel Supply System 10

The fuel supply system 10 is mounted on a vehicle.

Figure 1:
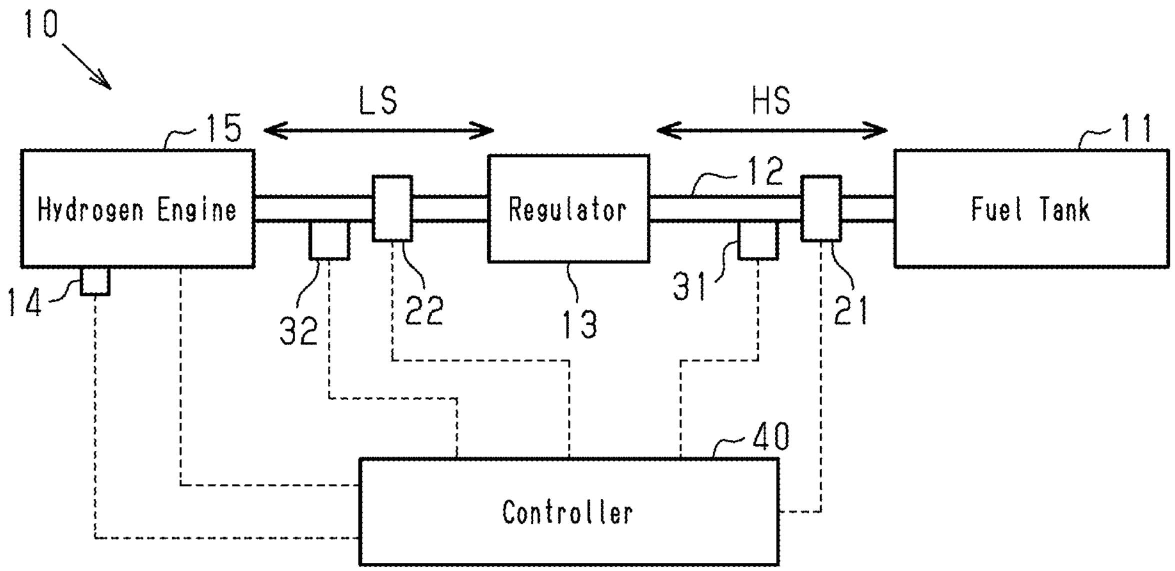
FIG. 1 is a schematic diagram showing a configuration of a fuel supply system including a controller according to an embodiment.

The fuel tank 11 stores hydrogen gas supplied from the outside. As shown in FIG. 1, the fuel tank 11 is connected to the hydrogen engine 15 through the hydrogen pipe 12. The hydrogen pipe 12 guides the hydrogen gas from the fuel tank 11 to the hydrogen engine 15. The hydrogen gas guided to the hydrogen engine 15 is injected from an injector of the hydrogen engine 15 into a cylinder of the hydrogen engine 15.

The hydrogen engine 15 burns hydrogen gas as fuel in the cylinder and outputs driving force of a vehicle that has the fuel supply system 10. As shown in FIG. 1, the hydrogen engine 15 is provided with a rotation speed sensor 14. The rotation speed sensor 14 measures the rotation speed of the hydrogen engine 15.

As shown in FIG. 1, a regulator 13, a plurality of shut-off valves, and a plurality of pressure sensors are installed on the hydrogen pipe 12.

The regulator 13 reduces the pressure of the hydrogen gas supplied from the fuel tank 11 to the hydrogen engine 15 to regulate the pressure of the hydrogen gas to a level that is appropriate to the hydrogen engine 15.

FIG. 1 shows a high-pressure section HS and a low-pressure section LS in the hydrogen pipe 12. The high-pressure section HS is a portion of the hydrogen pipe 12 through which the hydrogen gas flows before flowing through the regulator 13. The low-pressure section LS is a portion of the hydrogen pipe 12 through which the hydrogen gas flows after flowing through the regulator 13.

As shown in FIG. 1, the fuel supply system 10 includes a first shut-off valve 21 and a second shut-off valve 22 as the plurality of shut-off valves. The shut-off valve shuts off the supply of hydrogen gas from the fuel tank 11 to the hydrogen engine 15.

As shown in FIG. 1, the first shut-off valve 21 is arranged on a portion of the hydrogen pipe 12 between the fuel tank 11 and the regulator 13. When the first shut-off valve 21 is closed, the high-pressure section HS is closed.

As shown in FIG. 1, the second shut-off valve 22 is arranged on a portion of the hydrogen pipe 12 between the regulator 13 and the hydrogen engine 15. When the second shut-off valve 22 is closed, the low-pressure section LS is closed.

As shown in FIG. 1, the fuel supply system 10 includes a first pressure sensor 31 and a second pressure sensor 32 as the plurality of pressure sensors. As shown in FIG. 1, the first pressure sensor 31 is arranged on a portion of the high-pressure section HS at the downstream side of the first shut-off valve 21. As shown in FIG. 1, the second pressure sensor 32 is arranged on a portion of the low-pressure section LS at the downstream side of the second shut-off valve 22.

As shown in FIG. 1, the fuel supply system 10 includes a controller 40.

As shown in FIG. 1, the controller 40 is communicably connected to the hydrogen engine 15. The controller 40 can control the operation of the hydrogen engine 15.

As shown in FIG. 1, the controller 40 is communicably connected to the first shut-off valve 21 and the second shut-off valve 22. The controller 40 can control the opening and closing of the first shut-off valve 21 and the second shut-off valve 22.

As shown in FIG. 1, the controller 40 is communicably connected to the first pressure sensor 31 and the second pressure sensor 32. The controller 40 acquires values measured by the first pressure sensor 31 and the second pressure sensor 32.

As shown in FIG. 1, the controller 40 is communicably connected to the rotation speed sensor 14. The controller 40 acquires values measured by the rotation speed sensor 14.

Failure Determination Routine

The controller 40 executes a failure determination routine. The failure determination routine is a series of processes performed by the controller 40 to determine whether a shut-off valve has a failure. In this description, a failure in the shut-off valve refers to a state in which the shut-off valve is not properly closed despite an instruction from the controller 40 to close the shut-off valve. For example, when an object is caught in the shut-off valve, the above-described failure occurs.

Figure 2:
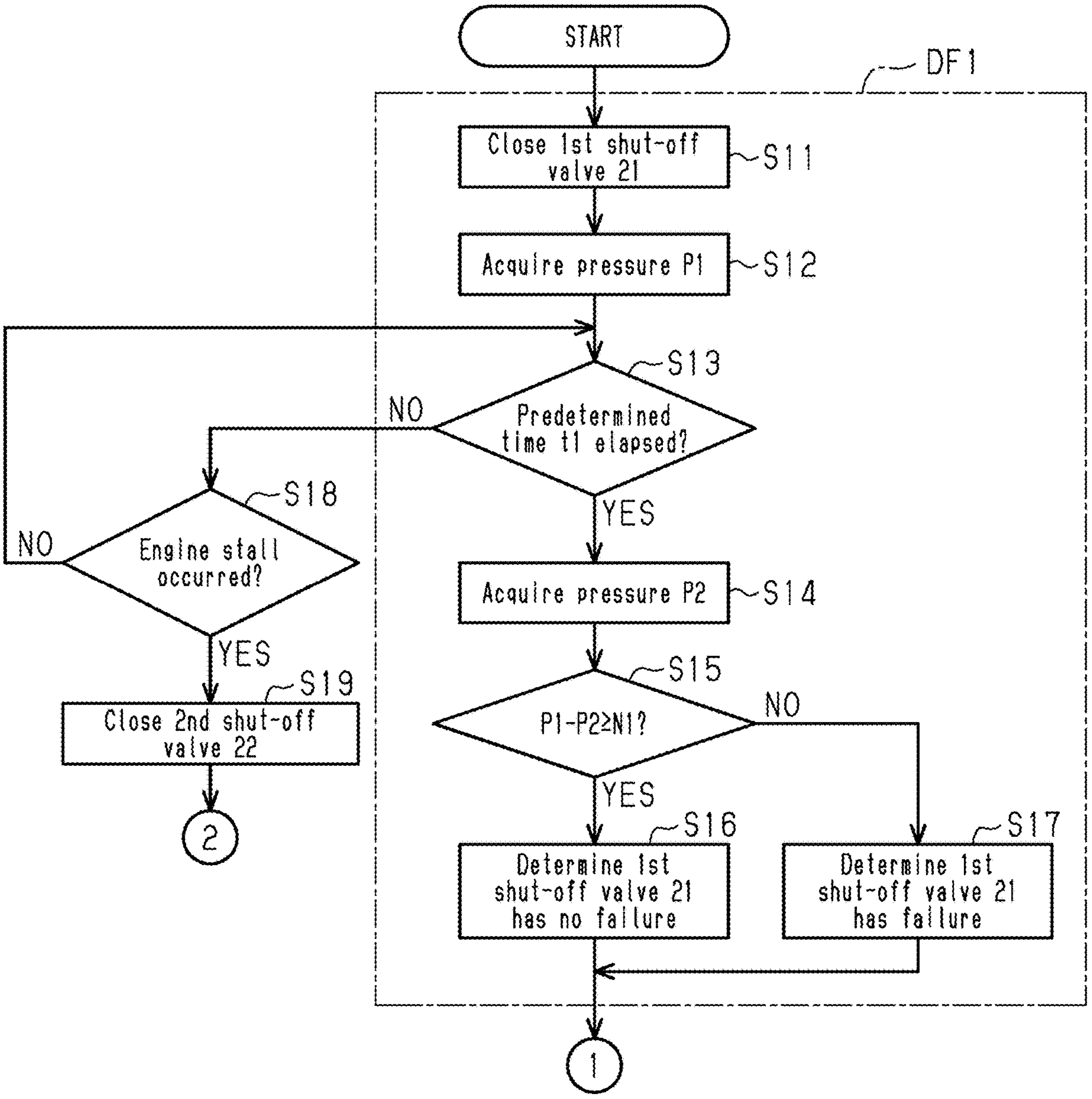
FIG. 2 is a flowchart showing a flow of a series of processes in a first failure determination routine executed by the controller of FIG. 1.
Figure 3:
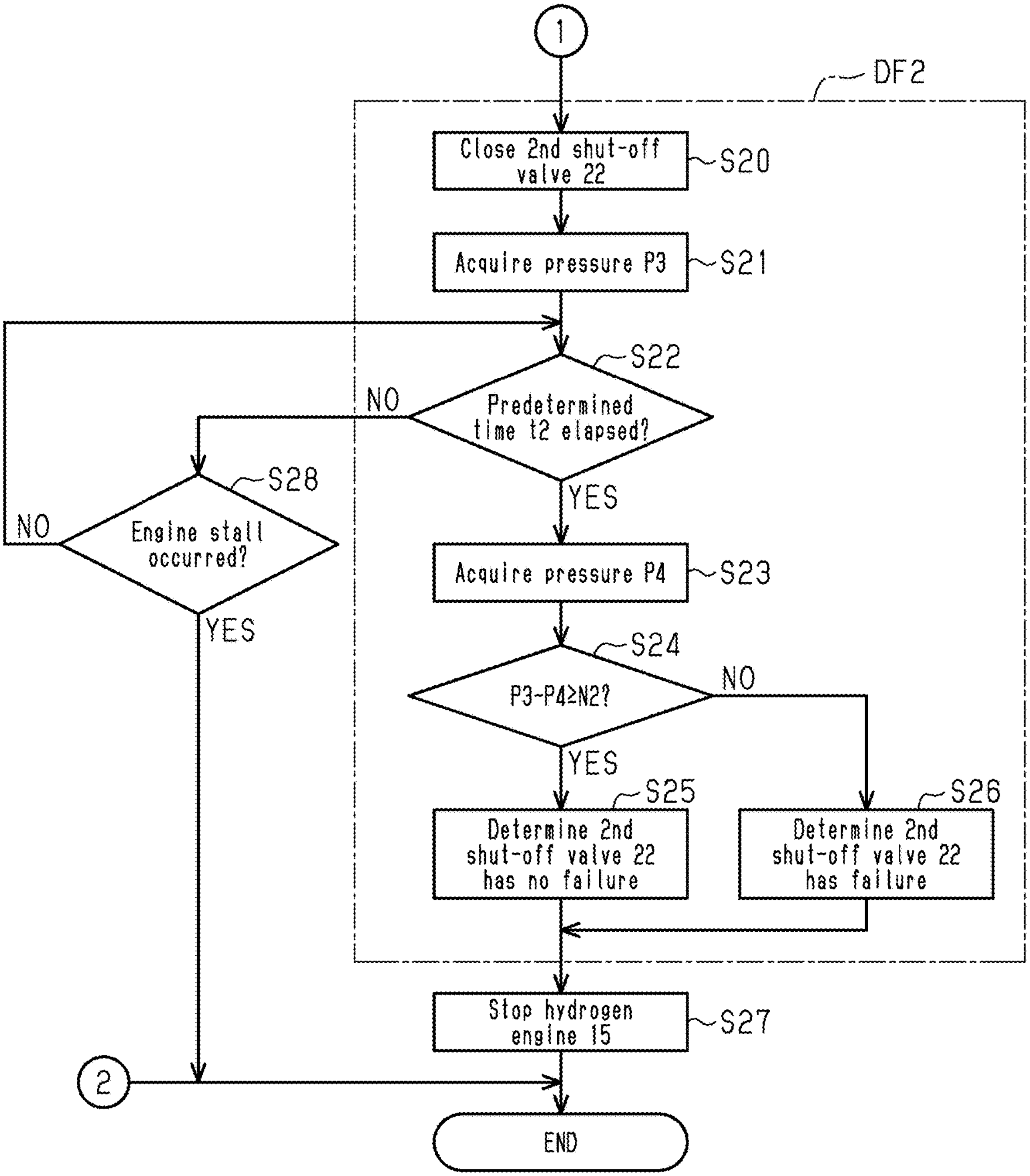
FIG. 3 is a flowchart showing a flow of a series of processes in a second failure determination routine executed by the controller of FIG. 1.

FIGS. 2 and 3 show a flow of a series of processes executed when the controller 40 performs the failure determination routine. The series of processes shown in FIGS. 2 and 3 is executed when the ignition switch is turned off. The operation of turning off the ignition switch is an operation of a user that requests to stop the hydrogen engine 15.

At the moment when the ignition switch is turned off, the controller 40 opens the first shut-off valve 21 and the second shut-off valve 22 while running the hydrogen engine 15. After the operation of turning off the ignition switch is performed, the controller 40 performs the failure determination routine while keeping the hydrogen engine 15 running.

Process in First Failure Determination Routine DF1

The process from step S11 to step S17 shown in FIG. 2 corresponds to a first failure determination routine DF1. The first failure determination routine DF1 determines whether the first shut-off valve 21 has a failure.

In the process of step S11, the controller 40 closes the first shut-off valve 21. In this process, the controller 40 maintains the second shut-off valve 22 in an open state.

In the process of step S12, the controller 40 acquires pressure P1. The pressure P1 is the pressure of the hydrogen gas at the downstream side of the first shut-off valve 21 immediately after the first shut-off valve 21 is closed. The controller 40 acquires the pressure P1 from the first pressure sensor 31.

In the process of step S13, the controller 40 determines whether or not a predetermined time t1 has elapsed after the first shut-off valve 21 is closed. The predetermined time t1 is determined in advance.

When the controller 40 determines that the predetermined time t1 has not elapsed in the process of step S13 (step S13: NO), the controller 40 proceeds to step S18.

In the process of step S18, the controller 40 determines whether or not an engine stall occurs during execution of the first failure determination routine DF1. The controller 40 determines that an engine stall has occurred when the rotation speed of the hydrogen engine 15 acquired from the rotation speed sensor 14 is zero.

When the controller 40 determines that an engine stall has not occurred in the process of step S18 (step S18: NO), the controller 40 executes the process of step S13 again.

When the controller 40 determines that the predetermined time t1 has elapsed in the process of step S13 (step S13: YES), the controller 40 proceeds to step S14. In the process of step S14, the controller 40 acquires pressure P2. The pressure P2 is the pressure of the hydrogen gas at the downstream side of the first shut-off valve 21 when the predetermined time t1 elapses after the first shut-off valve 21 is closed. The controller 40 acquires the pressure P2 from the first pressure sensor 31.

In the process of step S15, the controller 40 determines whether or not the difference between the pressures P1 and P2 is greater than or equal to a threshold value N1.

In the first failure determination routine DF1, the hydrogen gas flowing through the hydrogen pipe 12 at the downstream side of the first shut-off valve 21 is gradually consumed by the hydrogen engine 15 during the predetermined time t1. When the first shut-off valve 21 is not properly closed, a decrease rate of the pressure of the hydrogen gas at the downstream side of the first shut-off valve 21 is lower than when the first shut-off valve 21 is properly closed.

In the processing from step S12 to step S15, the controller 40 monitors the decrease rate of the pressure of the hydrogen gas at the downstream side of the first shut-off valve 21. The difference between the pressures P1 and P2 reflects the decrease rate of the pressure of the hydrogen gas at the downstream side of the first shut-off valve 21.

The threshold value N1 is determined in advance by the manufacturer of the controller 40. The manufacturer of the controller 40, for example, sets the threshold value N1 based on the difference between the pressure P1 and the pressure P2 measured when the first shut-off valve 21 is properly closed.

In the process of step S15, when the controller 40 determines that the difference between the pressures P1 and P2 is greater than or equal to the threshold value N1 (step S15: YES), the controller 40 proceeds to step S16. In the process of step S16, the controller 40 determines that the first shut-off valve 21 does not have a failure.

When the controller 40 determines in the process of step S15 that the difference between the pressures P1 and P2 is less than the threshold value N1 (step S15: NO), the controller 40 proceeds to step S17. The state in which the difference between the pressure P1 and P2 is less than the threshold value N1 indicates that the decrease rate of the pressure of the hydrogen gas at the downstream side of the first shut-off valve 21 is lower than that when the first shut-off valve 21 is properly closed. In the process of step S17, the controller 40 determines that the first shut-off valve 21 has a failure. Thus, the determination result is output in the process of step S16 or the process of step S17, whereby the first failure determination routine DF1 is completed.

Process when First Failure Determination Routine DF1 Stops

When the controller 40 determines that an engine stall has occurred in the process of step S18 (step S18: YES), the controller 40 executes the process of step S19.

In the process of step S19, the controller 40 closes the second shut-off valve 22. As a result, all the shut-off valves installed in the fuel supply system 10 are closed.

As shown in FIG. 3, after executing the process of step S19, the controller 40 ends the series of processes shown in FIGS. 2 and 3. In this case, the controller 40 ends the series of processes shown in FIGS. 2 and 3 without determining whether the first shut-off valve 21 has a failure. That is, when the hydrogen engine 15 is stopped by an engine stall during the execution of the first failure determination routine DF1, the controller 40 stops the first failure determination routine DF1.

Process in Second Failure Determination Routine DF2

As shown in FIG. 3, when the first failure determination routine DF1 is completed, the controller 40 proceeds to step S20 and starts a second failure determination routine DF2. The second failure determination routine DF2 determines whether the second shut-off valve 22 has a failure. The processing from step S20 to step S26 shown in FIG. 3 corresponds to the second failure determination routine DF2. Thus, the controller 40 executes the failure determination routines while sequentially changing the target shut-off valve from the upstream side.

In the process of step S20, the controller 40 closes the second shut-off valve 22.

In the process of step S21, the controller 40 acquires pressure P3. The pressure P3 is the pressure of the hydrogen gas at the downstream side of the second shut-off valve 22 immediately after the second shut-off valve 22 is closed. The controller 40 acquires the pressure P3 from the second pressure sensor 32.

In the process of step S22, the controller 40 determines whether or not a predetermined time t2 has elapsed after the second shut-off valve 22 is closed. The predetermined time t2 is determined in advance.

When the controller 40 determines that the predetermined time t2 has not elapsed in the process of step S22 (step S22: NO), the controller 40 proceeds to step S28. In the process of step S28, the controller 40 determines whether or not an engine stall occurs during execution of the second failure determination routine DF2.

When the controller 40 determines that an engine stall has not occurred in the process of step S28 (step S18: NO), the controller 40 executes the process of step S22 again.

When the controller 40 determines that the predetermined time t2 has elapsed in the process of step S22 (step S22: YES), the controller 40 proceeds to step S23. In the process of step S23, the controller 40 acquires pressure P4. The pressure P4 is the pressure of the hydrogen gas at the downstream side of the second shut-off valve 22 when the predetermined time t2 elapses after the second shut-off valve 22 is closed. The controller 40 acquires the pressure P4 from the second pressure sensor 32.

In the process of step S24, the controller 40 determines whether or not the difference between the pressures P3 and P4 is greater than or equal to a threshold value N2.

In the second failure determination routine DF2, the hydrogen gas flowing through the portion of the hydrogen pipe 12 downstream of the second shut-off valve 22 is gradually consumed by the hydrogen engine 15 during the predetermined time t2. When the second shut-off valve 22 is not properly closed, a decrease rate of the pressure of the hydrogen gas at the downstream side of the second shut-off valve 22 is lower than when the second shut-off valve 22 is properly closed.

The difference between the pressures P3 and P4 reflects the decrease rate of the pressure of the hydrogen gas at the downstream side of the second shut-off valve 22. In the processing from step S21 to step S24, the controller 40 monitors the decrease rate of the pressure of the hydrogen gas at the downstream side of the second shut-off valve 22.

Similar to the threshold value N1, the threshold value N2 is determined in advance by the manufacturer of the controller 40. The manufacturer of the controller 40, for example, sets the threshold value N2 based on the difference between the pressure P3 and the pressure P4 measured when the second shut-off valve 22 is properly closed.

In the process of step S24, when the controller 40 determines that the difference between the pressures P3 and P4 is greater than or equal to the threshold value N2 (step S24: YES), the controller 40 proceeds to step S25. In the process of step S25, the controller 40 determines that the second shut-off valve 22 does not have a failure.

When the controller 40 determines in the process of step S24 that the difference between the pressures P3 and P4 is less than the threshold value N2 (step S24: NO), the controller 40 proceeds to step S26. A state in which the difference between the pressure P3 and P4 is less than the threshold value N2 indicates that the decrease rate of the pressure of the hydrogen gas at the downstream side of the second shut-off valve 22 is lower than that when the second shut-off valve 22 is properly closed. In the processing of step S26, the controller 40 determines that the second shut-off valve 22 has a failure. In this way, the determination result is output in the process of step S25 or the process of step S26, whereby the second failure determination routine DF2 is completed.

When the first failure determination routine DF1 and the second failure determination routine DF2 are completed, all the failure determination routines end. After all the failure determination routines are completed, the controller 40 executes the process of step S27. In the process of step S27, the controller 40 stops the hydrogen engine 15. Then, the controller 40 ends the series of processes shown in FIGS. 2 and 3.

Process when Second Failure Determination Routine DF2 Stops

When the controller 40 determines that an engine stall has occurred in the process of step S28 (step S28: YES), the controller 40 ends the series of processes shown in FIGS. 2 and 3. In this case, the controller 40 ends the series of processes shown in FIGS. 2 and 3 without determining whether the second shut-off valve 22 has a failure. That is, when the hydrogen engine 15 is stopped by an engine stall during the execution of the second failure determination routine DF2, the controller 40 stops the second failure determination routine DF2. In this case, the controller 40 stops the second failure determination routine DF2 in a state where all the shut-off valves installed in the fuel supply system 10 are closed.

Process Executed by Controller 40 when Engine Stall Occurs during Traveling of Vehicle During traveling of the vehicle, the controller 40 runs the hydrogen engine 15 in accordance with the travel state of the vehicle. During traveling of the vehicle, the controller 40 opens the first shut-off valve 21 and the second shut-off valve 22 while running the hydrogen engine 15.

Figure 4:
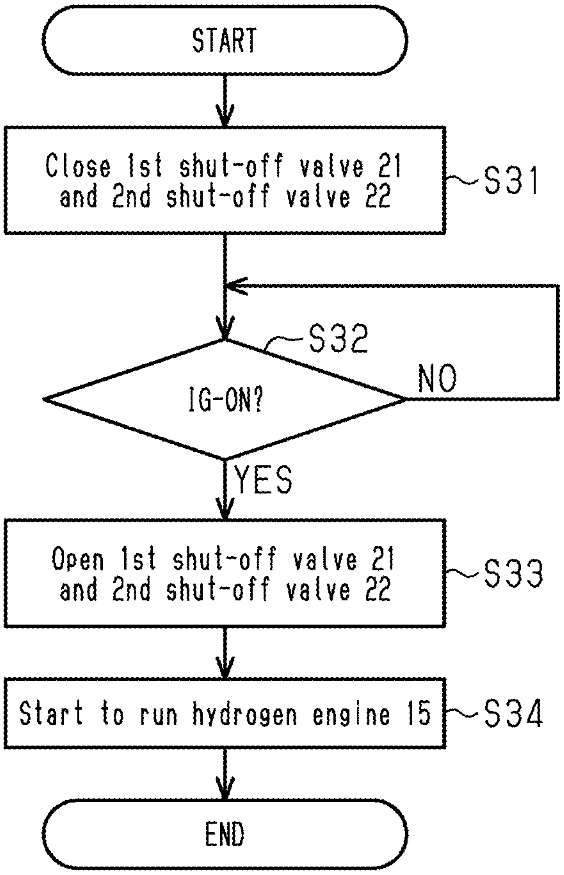
FIG. 4 is a flowchart showing a flow of a series of processes executed by the controller when an engine stall occurs during traveling of the vehicle.

FIG. 4 shows a series of processes executed by the controller 40 when an engine stall occurs during traveling of the vehicle.

When an engine stall occurs during traveling of the vehicle, the controller 40 performs the process of step S31. At the moment when an engine stall occurs during traveling of the vehicle, the first shut-off valve 21 and the second shut-off valve 22 are open. In the process of step S31, the controller 40 closes the first and second shut-off valves 21 and 22.

In the process of step S32, the controller 40 determines whether or not the user has performed an operation to turn on the ignition switch (IG-ON). The operation of turning on the ignition switch is an operation that requests to run the hydrogen engine 15.

When the controller 40 determines that the operation of turning on the ignition switch is not performed in the process of step S32 (step S32: NO), the controller 40 executes the process of step S32 again. When the controller 40 determines that the operation of turning on the ignition switch has been performed in the process of step S32 (step S32: YES), the controller 40 proceeds to step S33.

In the process of step S33, the controller 40 opens the first and second shut-off valves 21 and 22. Thus, the hydrogen gas in the fuel tank 11 is supplied to the hydrogen engine 15.

In the process of step S34, the controller 40 starts to run the hydrogen engine 15. Thus, the controller 40 can restart the traveling of the vehicle after the engine stall occurs. The controller 40 that has started to run the hydrogen engine 15 ends the series of processes shown in FIG. 4.

Operation of the Present Embodiment

When an engine stall occurs during the execution of the failure determination routine, the hydrogen gas in the hydrogen pipe 12 is not consumed. Therefore, when an engine stall occurs during execution of the failure determination routine, the decrease rate of the pressure of hydrogen gas at the downstream side of the shut-off valve is lower than that when an engine stall does not occur. Therefore, when an engine stall occurs during the execution of the failure determination routine, the controller 40 may erroneously determine that the shut-off valve has a failure. The controller 40 stops the failure determination routine when an engine stall occurs during the execution of the failure determination routine.

Advantages of the Present Embodiment (1) The controller 40 limits the erroneous determination of the failure of the shut-off valve when the engine stall occurs during the execution of the failure determination routine.

(2) The fuel supply system 10 includes a plurality of shut-off valves. The controller 40 executes the failure determination routine when the shut-off valves located at the downstream side of a target shut-off valve are open as the target shut-off valve is sequentially changed from the upstream side. When the hydrogen engine 15 is stopped due to an engine stall during the execution of the failure determination routine, the fuel supply system 10 closes all the shut-off valves and stops the failure determination routine.

Even when the injector does not inject the hydrogen gas due to an engine stall, the hydrogen gas may leak from the injector into the hydrogen engine 15. The controller 40 executes the failure determination routine in a state where the shut-off valves arranged at the downstream side of the target shut-off valve are opened. Therefore, when an engine stall occurs during the failure determination routine, hydrogen gas flowing through an open shut-off valve may leak from the injector into the hydrogen engine 15 that is not in operation.

When an engine stall occurs during execution of the failure determination routine, the controller 40 closes all of the shut-off valves included in the fuel supply system 10. As a result, the controller 40 can reduce the amount of hydrogen gas that leaks from the injector into the hydrogen engine 15 that is not in operation.

(3) The fuel supply system 10 includes the regulator 13 arranged on the hydrogen pipe 12 to regulate the pressure of the hydrogen gas supplied from the fuel tank 11 to the hydrogen engine 15. The fuel supply system 10 is provided with the first shut-off valve 21 and the second shut-off valve 22 as shut-off valves. The first shut-off valve 21 is arranged on a portion of the hydrogen pipe 12 between the fuel tank 11 and the regulator 13. The second shut-off valve 22 is arranged on a portion of the hydrogen pipe 12 between the regulator 13 and the hydrogen engine 15. The controller 40 executes the first failure determination routine DF1, which is a failure determination routine performed on the first shut-off valve 21, while keeping the hydrogen engine 15 running in a state where the first shut-off valve 21 is closed and the second shut-off valve 22 is open. The controller 40 executes the second failure determination routine DF2, which is a failure determination routine performed on the second shut-off valve 22, while keeping the hydrogen engine 15 running in a state where the first shut-off valve 21 and the second shut-off valve 22 are closed. When the hydrogen engine 15 is stopped due to an engine stall during execution of the first failure determination routine DF1, the controller 40 closes the second shut-off valve 22 while keeping the first shut-off valve 21 closed, and stops the first failure determination routine DF1. When the hydrogen engine 15 is stopped due to an engine stall during execution of the second failure determination routine DF2, the controller 40 stops the second failure determination routine DF2 while keeping the first and second shut-off valves 21 and 22 closed.

The fuel supply system 10 includes the two shut-off valves, namely, the first shut-off valve 21 and the second shut-off valve 22, so as to sandwich the regulator 13. The controller 40 stops the failure determination routine in a state where both the first shut-off valve 21 and the second shut-off valve 22 are closed when an engine stall occurs while executing the failure determination routine for each of the first shut-off valve 21 and the second shut-off valve 22. Thus, in the fuel supply system 10 including the first shut-off valve 21 and the second shut-off valve 22, the controller 40 can reduce the amount of hydrogen gas that leaks from the injector into the hydrogen engine 15 when an engine stall occurs during execution of the failure determination routine.

(4) The controller 40 operates the hydrogen engine 15 in accordance with the traveling state of the vehicle during traveling of the vehicle, and opens the shut-off valve while the hydrogen engine 15 is in operation. When the hydrogen engine 15 is stopped due to an engine stall during traveling of the vehicle, the controller 40 closes the shut-off valve.

During traveling of the vehicle, the controller 40 opens the shut-off valve while the hydrogen engine 15 is running. Therefore, at the moment when the hydrogen engine 15 is stopped due to an engine stall during traveling of the vehicle, the shut-off valve is open.

The controller 40 closes the shut-off valve when an engine stall occurs during traveling of the vehicle. As a result, the controller 40 can reduce the amount of hydrogen gas that leaks from the injector into the hydrogen engine 15 that is not in operation when an engine stall occurs during traveling of the vehicle.

(5) When the user performs an operation to request to run the hydrogen engine 15 after the shut-off valve is closed due to an engine stall that has occurred during traveling of the vehicle, the controller 40 opens the shut-off valve and then runs the hydrogen engine 15.

The controller 40 operates the hydrogen engine 15 so as to restart the traveling of the vehicle when a user performs an operation that requests to run the engine after the engine stall occurs during traveling of the vehicle. When the controller 40 runs the hydrogen engine 15, if the amount of hydrogen gas that can be injected by the injector is small, there is a possibility that the hydrogen engine 15 that has started to operate will again stall.

The controller 40 runs the hydrogen engine 15 after opening the shut-off valve to allow the injector to use the hydrogen gas in the fuel tank 11. As a result, the controller 40 can limit the occurrence of an engine stall when the hydrogen engine 15 resumes running.

MODIFIED EXAMPLES

The embodiments described above may be modified as follows. The above-described embodiment and the following modifications can be combined as long as the combined modifications remain technically consistent with each other.

The fuel supply system 10 includes two shut-off valves, i.e., the first shut-off valve 21 and the second shut-off valve 22. The number of shut-off valves installed in the fuel supply system 10 is not limited to that in the above-described embodiment. The fuel supply system 10 may include three or more shut-off valves. The fuel supply system 10 may include one shut-off valve.

The fuel supply system 10 described above includes the regulator 13. The fuel supply system 10 may not include the regulator 13.

The above-described controller 40 sequentially changes the shut-off valve to be subjected to the failure determination routine from the upstream side. The mode in which the controller 40 changes the target of the failure determination routine is not limited to the above-described embodiment. For example, the controller 40 may change the shut-off valve to be subjected to the failure determination routine in order from the downstream side.

When the hydrogen engine 15 is stopped due to an engine stall during execution of the failure determination routine, the controller 40 do not have to close all of the shut-off valves. For example, the controller 40 may not close the second shut-off valve 22 when the hydrogen engine 15 is stopped due to an engine stall during execution of the first failure determination routine DF1.

The controller 40 does not have to close the shut-off valve even when the hydrogen engine 15 is stopped due to engine stall during traveling of the vehicle.

When an engine stall occurs during traveling of the vehicle, the controller 40 closes all the shut-off valves. The controller 40 may close only some of the plurality of shut-off valves when an engine stall occurs during traveling of the vehicle.

The controller 40 may open the shut-off valve after running the hydrogen engine 15 when the user performs an operation that requests to run the hydrogen engine 15 after the shut-off valve is closed due to an engine stall that occurs during traveling of the vehicle.

The operation that requests to run the hydrogen engine 15 is not limited to the operation of turning on the ignition switch. For example, the operation that requests to run the hydrogen engine 15 may be an operation of turning an engine key. For example, the operation that requests to run the hydrogen engine 15 may be an operation of pressing a starter switch.

The controller 40 includes a central processing unit (CPU), a random access memory (RAM), and a read only memory (ROM). The controller 40 executes software processing. However, this is only an example. For example, the controller 40 may include a dedicated hardware circuit that processes at least a part of the software processing executed in the above-described embodiment. The dedicated hardware circuit is, for example, an application specific integrated circuit (ASIC). That is, the controller 40 may have any one of the following configurations (a) to (c). (a) The controller 40 includes a processor that executes all processes according to programs and a program storage device such as ROM that stores the programs. That is, the controller 40 includes a software execution device. (a) The controller 40 includes a processor that executes part of processes according to programs and a program storage device. The controller 40 further includes a dedicated hardware circuit that executes the other processes. (c) The controller 40 includes a dedicated hardware circuit that executes all processes. Multiple software execution devices and/or multiple dedicated hardware circuits may be provided. That is, the processes may be executed by processing circuitry including at least one of a software execution device and a dedicated hardware circuit. The processing circuitry may include multiple software execution devices and multiple dedicated hardware circuits. The program storage device, or computer readable medium, includes any type of storage device that is a medium accessible by a versatile computer or a dedicated computer.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A controller for a fuel supply system that includes a hydrogen engine configured to use hydrogen gas as fuel, a fuel tank configured to store the hydrogen gas, a hydrogen pipe used to guide the hydrogen gas from the fuel tank to the hydrogen engine, a shut-off valve arranged on the hydrogen pipe and configured to shut off supply of the hydrogen gas from the fuel tank to the hydrogen engine, and an injector configured to inject the hydrogen gas into the hydrogen engine, the controller comprising:

processing circuitry configured to control the shut-off valve and the hydrogen engine, wherein in response to an operation that requests to stop the hydrogen engine performed by a user of a vehicle including the fuel supply system, the processing circuitry is configured to execute a failure determination routine, the failure determination routine includes:

executing a control that closes the shut-off valve and then monitoring a decrease rate of pressure of the hydrogen gas at a downstream side of the shut-off valve while keeping the hydrogen engine running; and determining that the shut-off valve is not properly closed based on the decrease rate being less than that when the shut-off valve is properly closed, and the processing circuitry is configured to stop the failure determination routine in response to a stop of the hydrogen engine caused by an engine stall during execution of the failure determination routine.

2. The controller according to claim 1, wherein the shut-off valve includes a first shut-off valve, the fuel supply system further includes a second shut-off valve arranged on the hydrogen pipe and configured to shut off supply of the hydrogen gas from the fuel tank to the hydrogen engine, the second shut-off valve is arranged at a downstream side of the first shut-off valve, the failure determination routine further includes, after determining whether the first shut-off valve is properly closed while the second shut-off valve is open:

executing a control that closes the second shut-off valve and then monitoring the decrease rate of pressure of the hydrogen gas at a downstream side of the second shut-off valve while keeping the hydrogen engine running; and determining that the second shut-off valve is not properly closed based on the decrease rate being less than when the second shut-off valve is properly closed, and in response to a stop of the hydrogen engine caused by an engine stall during execution of the failure determination routine, the processing circuitry is configured to close the first shut-off valve and the second shut-off valve and stop the failure determination routine.

3. The controller according to claim 2, wherein the fuel supply system further includes a regulator arranged on the hydrogen pipe and configured to regulate pressure of the hydrogen gas supplied from the fuel tank toward the hydrogen engine, the first shut-off valve is arranged on a portion of the hydrogen pipe between the fuel tank and the regulator, the second shut-off valve is arranged on a portion of the hydrogen pipe between the regulator and the hydrogen engine, in response to a stop of the hydrogen engine caused by an engine stall during execution of the failure determination routine performed on the first shut-off valve, the processing circuitry is configured to execute a control that closes the second shut-off valve and stop the failure determination routine performed on the first shut-off valve while continuing to execute a control that closes the first shut-off valve, and in response to a stop of the hydrogen engine caused by an engine stall during execution of the failure determination routine performed on the second shut-off valve, the processing circuitry is configured to stop the failure determination routine performed on the second shut-off valve while continuing to execute a control that closes the first shut-off valve and the second shut-off valve.

4. The controller according to claim 1, wherein the processing circuitry is configured, during traveling of the vehicle, to run the hydrogen engine in accordance with a travel state of the vehicle and open the shut-off valve while the hydrogen engine is running, and the processing circuitry is configured to execute a control that closes the shut-off valve in accordance with a stop of the hydrogen engine caused by the engine stall during traveling of the vehicle.

5. The controller according to claim 4, wherein subsequent to executing a control that closes the shut-off valve in accordance with the engine stall, which occurred during traveling of the vehicle, the processing circuitry is configured to execute a control that opens the shut-off valve and then run the hydrogen engine in response to an operation of a user that requests to run the hydrogen engine.

* * * * *